(12) United States Patent
Morriss

(10) Patent No.: US 9,139,717 B2
(45) Date of Patent: Sep. 22, 2015

(54) GROUND TIRE RUBBER ADDITIVE AND ASPHALT INCLUDING SAME

(71) Applicant: CLOSE THE LOOP TECHNOLOGIES PTY LTD., Somerton (AU)

(72) Inventor: Steve Morriss, Research (AU)

(73) Assignee: CLOSE THE LOOP TECHNOLOGIES PTY LTD., Somerton, Victoria (AU)

( * ) Notice: Subject to any disclaimer, the term of this patent is extended or adjusted under 35 U.S.C. 154(b) by 0 days.

(21) Appl. No.: 14/205,764

(22) Filed: Mar. 12, 2014

(65) Prior Publication Data
US 2014/0275358 A1 Sep. 18, 2014

Related U.S. Application Data

(60) Provisional application No. 61/895,135, filed on Oct. 24, 2013, provisional application No. 61/793,027, filed on Mar. 15, 2013.

(30) Foreign Application Priority Data

Jul. 10, 2013 (AU) ................. 2013902540

(51) Int. Cl.
| | |
|---|---|
| C08L 21/00 | (2006.01) |
| C08K 11/00 | (2006.01) |
| C04B 18/00 | (2006.01) |
| C08K 3/34 | (2006.01) |
| C08L 95/00 | (2006.01) |
| C09J 11/00 | (2006.01) |
| C09D 195/00 | (2006.01) |
| C09J 195/00 | (2006.01) |
| E04D 7/00 | (2006.01) |
| C04B 26/26 | (2006.01) |
| C04B 40/00 | (2006.01) |
| E04D 1/20 | (2006.01) |
| C04B 111/00 | (2006.01) |

(52) U.S. Cl.
CPC ................. C08K 11/00 (2013.01); C04B 26/26 (2013.01); C04B 40/0039 (2013.01); C08K 3/346 (2013.01); C08K 11/005 (2013.01); C08L 21/00 (2013.01); C08L 95/00 (2013.01); C08L 95/005 (2013.01); C09D 195/00 (2013.01); C09J 195/00 (2013.01); E04D 7/00 (2013.01); C04B 2111/00586 (2013.01); E04D 1/20 (2013.01); Y02W 30/92 (2013.01)

(58) Field of Classification Search
CPC ........... C08L 95/00; C08L 101/00; C08J 3/22
USPC .......................................................... 524/68
See application file for complete search history.

(56) References Cited

U.S. PATENT DOCUMENTS

| | | | |
|---|---|---|---|
| 4,437,896 A | 3/1984 | Partanen | |
| 4,759,799 A | 7/1988 | Vicenzi | |
| 5,004,772 A | 4/1991 | Grzybowski et al. | |
| 5,047,457 A | 9/1991 | Higgins | |
| 5,362,316 A | 11/1994 | Paradise | |
| 5,618,340 A | 4/1997 | Krogh et al. | |
| 5,622,554 A | 4/1997 | Krogh et al. | |
| 5,730,791 A | 3/1998 | Krogh et al. | |
| 5,834,553 A | 11/1998 | Roberts, Sr. et al. | |
| 5,880,218 A * | 3/1999 | Gerace et al. | 525/239 |
| 6,113,681 A | 9/2000 | Tripathi et al. | |
| 6,706,787 B1 * | 3/2004 | Burris et al. | 524/60 |
| 7,238,230 B1 | 7/2007 | Moss et al. | |
| 2003/0084824 A1 * | 5/2003 | Matheson et al. | 106/739 |
| 2006/0249049 A1 * | 11/2006 | Martin | 106/273.1 |
| 2011/0160355 A1 * | 6/2011 | Martin | 524/68 |
| 2011/0184090 A1 * | 7/2011 | De Jonge et al. | 523/351 |
| 2013/0136855 A1 | 5/2013 | Subotic et al. | |
| 2014/0154221 A1 * | 6/2014 | Castro et al. | 424/93.7 |

FOREIGN PATENT DOCUMENTS

| | | |
|---|---|---|
| CN | 102617916 A | 8/2012 |
| CN | 102786805 A | 11/2012 |
| CN | 102850906 A | 1/2013 |
| EP | 0402573 A2 * | 12/1990 |
| EP | 9941611 B1 | 4/2000 |
| JP | H0873826 A | 3/1996 |
| JP | 2000169208 A | 6/2000 |
| KR | 20020062252 A | 7/2002 |
| KR | 20050001132 A | 1/2005 |
| KR | 20090129546 A | 12/2009 |
| MX | 6009660 A | 2/2008 |
| WO | 03025046 A1 | 3/2003 |
| WO | 2005054344 A1 | 6/2005 |

(Continued)

OTHER PUBLICATIONS

English Machine Translation of EP0402573A2, May 4, 2015.*

(Continued)

Primary Examiner — Randy Gulakowski
Assistant Examiner — Christopher M Rodd
(74) Attorney, Agent, or Firm — Kling & Schickli PLLC

(57) ABSTRACT

A modified ground tire rubber based additive includes (a) 30-99 weight percent of ground tire rubber, (b) 0-9-69.9 weight percent of a material selected from a group including a gelling clay, a reactive agent, an elastomer, a plastomer, a handling and agglomerating agent and mixtures thereof and (c) 0.1-5 weight percent compatibilizer.

17 Claims, 1 Drawing Sheet

(56) References Cited

FOREIGN PATENT DOCUMENTS

| WO | 2006107179 A2 | 10/2006 |
|---|---|---|
| WO | 2012131497 A2 | 10/2012 |

OTHER PUBLICATIONS

International Search Report and Written Opinion for International patent application No. PCT/AU2014/000245 dated May 1, 2014.
International Search Report and Written Opinion for International patent application No. PCT/AU2014/000247 dated May 1, 2014.
Yuan, E.; "The Chemistry of Toner Polymers"; Recharger Magazine, Baker Hughes Inc., Nov. 2008, pp. 57-60.
Vargas, M. A., et al.; "Asphalts Modified with SEBS Copolymers Functionalized with Various Amounts of Maleic Anhydride"; http://archivos.labcontrol.cl/wcce8/offline/techsched/manuscripts/x9s1dw.pdf.
Ahmed, N, et al.; "Effect of kaolin and calcined kaolin loading on styrene butadiene rubber composites"; Society of Plastics Engineers, Plastics Research Online, 2014; pp. 1-4, 10.2417/spepro.005234.
Amme, R.; "Ground Tire Rubber and Trans-Polyoctenamer as Asphalt Binder Additives"; University of Denver, Presentation to the Western Research Institute 2004 Symposium on Additives in Roadway Asphalts, Wyoming Jun. 23-25, 2004, 45 pages.
Evonik Industries; VESTENAMER® 8012—The Rubber Additive with Unique Properties; a registered trademark of the Evonik Degussa GmbH, Germany, Mar. 2009; Distributed by struktol Company of America; 4 pages.
Yildirim, Y, et al.; "The Toner-Modified Asphalt Demostration Projects"; Research Report No. FHWA/TX-05/5-3933-01-2, Implementation Project 5-3933-01: Toner Modified Asphalt, Center for Transportation Research Bureau of Engineering Research, The University of Texas at Austin, Dec. 2003, 119 pages.

\* cited by examiner

GROUND TIRE RUBBER ADDITIVE AND ASPHALT INCLUDING SAME

This document claims the benefit of priority in U.S. Provisional Patent Application Ser. No. 61/895,135 filed on Oct. 24, 2013, and U.S. Provisional Patent Application Ser. No. 61/793,027 filed on Mar. 15, 2013, the full disclosures of which are incorporated herein by reference.

TECHNICAL FIELD

This document relates generally to the asphalt paving field and more particularly to a modified ground tire rubber based asphalt additive and new asphalt and asphalt concrete compositions incorporating that additive.

BACKGROUND

This document relates to the use of a modified ground tire rubber based asphalt additive and a new asphalt and asphalt concrete compositions incorporating that additive. The modified ground tire rubber based additive described herein is made by mixing ground tire rubber with a second component selected from a group consisting of a gelling clay, a reactive agent, an elastomer, a plastomer, a handling and agglomerating agent and mixtures thereof as well as a compatibilizer. During the mixing and agglomerating process, the ground tire rubber undergoes frictional heating, shear, centering, coalescence and fusion to promote molecular entanglements and polar-polar interactions between the ground tire rubber particles and other components of the additive including any elastomer and plastomer. These molecular entanglements and polar-polar interactions are further enhanced by the compatibilizer provided in the additive. The ground tire rubber particles in the resulting modified ground tire rubber based additive have undergone a physical change that renders them better suited for use as an asphalt additive.

More particularly, the modified ground tire rubber based additive is in the form of granules, of perhaps 0.3-3.0 mm in diameter that are easy to handle. Further, the modified ground tire rubber based additive enhances both the high temperature and low temperature performance of the asphalt to which it is added. More specifically, the elastomeric properties of the ground tire rubber serve to impart a flexibility to the asphalt at low temperatures so that it is better able to resist cracking in response to freeze-thaw cycles. However, when used alone, the elastomer of the ground tire rubber does nothing to improve but, in fact, degrades the high temperature performance of the asphalt by reducing its resistance to longitudinal rutting and high-temperature induced micro-cracking of the road surface. In contrast, the modified ground tire rubber additive disclosed herein includes ground tire rubber that has been modified and subjected to molecular entanglements and polar-polar interactions with plastomers that serve to increase the stiffness of the asphalt to improve the high temperature performance of the asphalt so that it will better resist longitudinal rutting and microcracking when subjected to high temperatures. Advantageously, the additive provides the proper balance between plastomer properties and elastomer properties to actually enhance both high temperature and low temperature performance of any asphalt incorporating the additive. Further, this is done in a single additive with the proper proportions to provide the best results. Such a single additive is simple and convenient to use. Further, such a single additive eliminates any potential for human error of adding too much plastomer or too much elastomer when performing onsite asphalt mixing.

Thus, it should be appreciated that this document not only describes a novel modified ground tire rubber based asphalt additive particularly suited for use in asphalt roadways but also a new range of asphalt and asphalt concrete compositions, made possible with the use of additives at the agglomeration stage that offer vastly superior features and benefits in asphalt when compared to unprocessed ground tire rubber.

SUMMARY

A modified ground tire rubber based additive comprises 30-99 weight percent of ground tire rubber, 0.9-69.9 weight percent of a material selected from a group consisting of a gelling clay, a reactive agent, an elastomer, a plastomer, a handling and agglomerating agent and mixtures thereof and 0.1-5 weight percent compatibilizer. In another possible embodiment the additive includes 40-70 weight percent ground tire rubber, 1-10 weight percent gelling clay, 0.1-5 weight percent reactive agent, 0.5-5 weight percent elastomer, 10-25 weight percent plastomer, 0.5-5 weight percent handling and agglomerating agent and 0.5-5 weight percent compatibilizer. In yet another possible embodiment the additive includes 30-50 weight percent ground tire rubber, 0.5-10 weight percent gelling clay, 0.1-3.0 weight percent reactive agent, 3-10 weight percent elastomer, 25-35 weight percent plastomer, 0.1-5 weight percent handling and agglomerating agent and 0.1-5 weight percent compatibilizer.

In one possible embodiment the gelling clay is selected from a group of materials consisting of bentonite, montmorillonite, attapulgite, gilsonite and mixtures thereof. In one possible embodiment the reactive agent is selected from a group of materials consisting of a peroxide, hydrogen peroxide, benzoyl peroxide, a sulfur containing compound, sulfuric acid, sulfur and mixtures thereof. In one possible embodiment the elastomer is selected from a group consisting of latex rubber, waste water-based paint, crumb rubber, chemically treated crumb rubber, and mixtures thereof. In one possible embodiment the plastomer is selected from a group consisting of polystyrene (PS), high impact resistant polystyrene (HIPS), poly(acrylonitrile-co-butadiene-co-styrene) (ABS), poly(phenylene oxide) (PPO), glass filled polyethylene terephthalate (GF PET), poly(ethylene terephthalate) (PET), acrylic and polyester, either virgin or recycled.

In one possible embodiment the handling and agglomerating agent is selected from a group of materials consisting of an oil, a wax, soybean oil, linseed oil, engine oil, recycled engine oil, vegetable oil, engineering oil, recycled engineering oil, ship oil, recycled ship oil, olive oil, hydraulic oil, hydrogenated castor oil (HCO), hydrogenated palm oil, stearic acid, sasol C80, montan E, paraffin, carnauba wax, slack wax, sasol H1, recycled PE wax, sasobit, microcrystalline wax and mixtures thereof. In one possible embodiment the compatibilizer is selected from a group of materials consisting of a maleic anhydride (MAH) grafted polymer, benzoil peroxide, polyphosphoric acid (PPA), transpolyoctenamer rubber (TOR) and mixtures thereof.

In one possible embodiment the ground tire rubber used in the additive is in particle form where the particles have a diameter of between 5 mm and 0.05 mm. In one possible embodiment the ground tire rubber is between 325 and 3 mesh. In one possible embodiment the additive is mixed at a temperature of 40-110° C. to promote molecular entanglements and polar-polar interactions between the ground tire rubber and any plastomer and elastomer in the additive.

In accordance with an additional aspect, an asphalt concrete is provided incorporating the modified ground tire additive. That asphalt in one embodiment includes 75-90 weight percent aggregate, 3.5-10.5 weight percent bitumen and 0.5-20 weight percent modified ground tire rubber based additive.

In accordance with yet another aspect, an asphalt concrete is provided incorporating the modified ground tire rubber based additive. In one embodiment that asphalt concrete includes 70-90 weight percent aggregate material, 4-7 weight percent bitumen and 0.1-15 weight percent modified ground tire rubber based additive.

These and other embodiments will be set forth in the description which follows, and in part will become apparent to those of ordinary skill in the art by reference to the following description and drawings.

BRIEF DESCRIPTION OF THE DRAWINGS

The accompanying drawings incorporated herein and forming a part of the specification, illustrate several aspects of the additive and together with the description serve to explain certain principles thereof. In the drawings.

Figure 1:
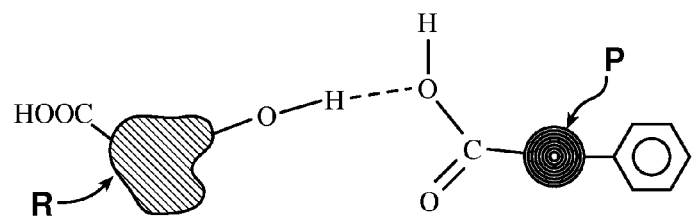
FIG. 1 illustrates polar-polar interaction between a ground tire rubber particle and a plastomer particle.

Reference will now be made in detail to the present preferred embodiments of the additive, examples of which are illustrated in the accompanying drawings.

DETAILED DESCRIPTION

A modified ground tire rubber based additive is provided comprising 30-99 weight percent of ground tire rubber, 0.9-69.9 weight percent of a material selected from a group consisting of a gelling clay, a reactive agent, an elastomer, a plastomer, a handling and agglomerating agent and mixtures thereof and 0.1-5 weight percent of a compatibilizer. In another possible embodiment the additive includes 40-70 weight percent ground tire rubber, 1-10 weight percent gelling clay, 0.1-5 weight percent reactive agent, 0.5-5 weight percent elastomer, 10-25 weight percent plastomer, 0.5-5 weight percent handling and agglomerating agent and 0.5-5 weight percent compatibilizer. In yet another possible embodiment the additive includes 30-50 weight percent ground tire rubber, 0.5-10 weight percent gelling clay, 0.1-3 weight percent reactive agent, 3-10 weight percent elastomer, 25-35 weight percent plastomer, 0.1-5 weight percent handling and agglomerating agent and 0.1-5 weight percent compatibilizer. In any of the embodiments the additive is an agglomeration of materials held together at the molecular level by polymer chain entanglements and polar-polar interactions.

In one embodiment, the ground tire rubber starting material used to make the agglomerated additive is particles have a diameter of between 5 mm and 0.05 mm. In another possible embodiment the ground tire rubber particles are between 325 and 3 mesh.

In one possible embodiment the gelling clay used in the additive is selected from a group including, but not necessarily limited to, bentonite, montmorillonite, attapulgite, gilsonite and mixtures thereof. In one possible embodiment the reactive agent used in the additive is selected from a group including, but not necessarily limited to, a peroxide, hydrogen peroxide, benzoyl peroxide, a sulfur containing compound, sulfuric acid, sulfur and mixtures thereof. These reactive agents react with the ground tire rubber to modify the surface of the rubber to better allow bonding (a) with thermoplastics such as the other elastomers and plastomers in the additive (e.g. the acrylic in the water-based paint and the ABS plastomer) and (b) the asphaltenes in the bitumen of the asphalt concrete.

In one possible embodiment the elastomer used in the additive is selected from a group including, but not necessarily limited to, latex rubber, waste water-based paint (latex paint), crumb rubber, chemically treated crumb rubber, and mixtures thereof. In one possible embodiment the plastomer used in the additive is selected from a group including, but not necessarily limited to, polystyrene (PS), high impact resistant polystyrene (HIPS), poly(acrylonitrile-co-butadiene-co-styrene) (ABS), poly(phenylene oxide) (PPO), glass filled polyethylene terephthalate (GF PET), poly(ethylene terephthalate) (PET), acrylic, polyester and mixtures thereof. This includes either virgin or recycled materials.

In one possible embodiment, the handling and agglomerating agent is selected from a group including, but not necessarily limited to, an oil, a wax, soybean oil, linseed oil, engine oil, recycled engine oil, vegetable oil, engineering oil, recycled engineering oil, ship oil, recycled ship oil, olive oil, hydraulic oil, hydrogenated castor oil (HCO), hydrogenated palm oil, stearic acid, sasol C80, montan E, paraffin, carnauba wax, slack wax, sasol H1, recycled PE wax, sasobit, microcrystalline wax and mixtures thereof. In one possible embodiment, the compatibilizer is selected from a group including, but not necessarily limited to, maleic anhydride (MAH) grafted polymer, benzoil peroxide, polyphosphoric acid (PPA), transpolyoctenamer rubber (TOR) and mixtures thereof.

Figure 2:
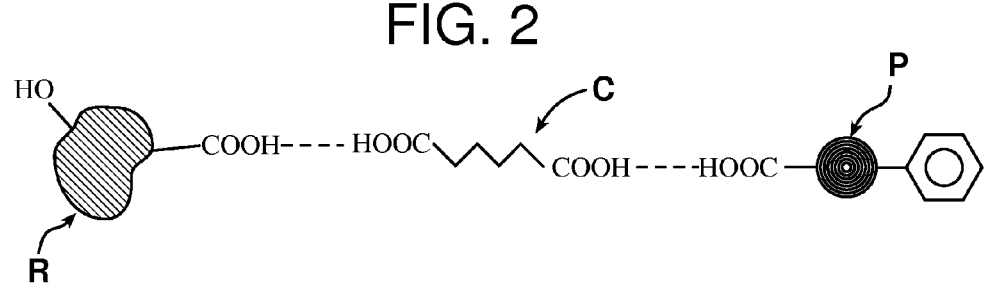
FIG. 2 illustrates polar-polar interaction between a compatibilizer, a ground tire rubber particle and a plastomer particle.

The modified ground tire rubber based additive is prepared by mixing the ground tire rubber with any of the desired gelling clays, reactive agents, elastomers, plastomers and/or handling and agglomerating agents and the compatibilizer in, for example, a sigma blade or intensive mixer at very high shear rates. When this mixing is completed at temperatures of 40-110° C. the ground tire rubber material in the mixture as well as any other elastomer and plastomer therein is subjected to thermal expansion. This thermal expansion opens the pores, cavities and pockets of these materials so that all components of the agglomerated mass are intermixed with the smaller particles received in the open pores, cavities and pockets of the larger particles where they stick, cling in place and become entrapped as the materials cool. Further, it should be appreciated that the mixing process at the indicated temperatures promotes molecular entanglements and polar-polar interactions between the ground tire rubber particles and any plastomer particles and other elastomer particles in the additive. For example, FIG. 1 illustrates polar-polar interaction (note dashed line) between a ground tire rubber particle R and a plastomer particle P. FIG. 2 illustrates polar-polar interaction (note dashed line) between a compatibilizer C, a ground tire rubber particle R and a plastomer P. These two figures are just illustrative of possible polar-polar interactions and it should be appreciated that such interactions are not specifically limited to those shown in these figures. Significantly, what is clear is that the ground tire rubber in the resulting agglomerated mass undergoes a physical change during the mixing process which produces a more useful product.

In accordance with an additional aspect, an asphalt is provided incorporating the modified ground tire rubber based additive herein described. That asphalt includes 4-7 weight percent bitumen and 3-15 weight percent modified ground tire rubber based additive.

In accordance with yet another aspect, an asphalt concrete is provided incorporating the modified ground tire rubber based additive. In one possible embodiment the asphalt concrete includes 70-90 weight percent aggregate material, 4-7 weight percent bitumen and 0.1-15 weight percent modified ground tire rubber based additive. In another possible embodiment the asphalt concrete includes 75-85 weight percent aggregate material, 4-7 weight percent bitumen and 0.1-15 weight percent modified ground tire rubber based additive. It should be appreciated that the asphalt and asphalt concrete compositions described in this document may also include other asphalt additives known to be useful to those skilled in the art. Such additives include but are not necessarily limited to fibers, release agents and emulsifiers.

Figure 3:
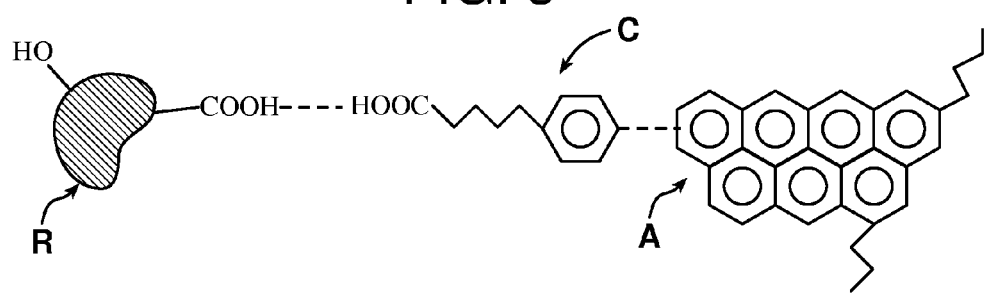
FIG. 3 illustrates polar-polar interaction between a ground tire rubber particle, a compatibilizer and an asphaltene found in a bitumen.

When the modified ground tire rubber based additive is added to asphalt and asphalt concrete including bitumen, polar-polar interactions (note dashed lines) are present between the ground tire rubber particles R, the compatibilizer C and the asphaltene A of the bitumen (see FIG. 3). These function to enhance the properties of the asphalt and asphalt concrete. More specifically, roadways and pavement constructed with these asphalt materials incorporating the ground tire rubber based additive described herein have a desired balance of plastomeric and elastomeric properties necessary to improve both the high temperature and low temperature performance of the roadway/pavement. The following examples will further illustrate the invention.

EXAMPLE 1

One example additive consists of 45-55 weight percent cryogenically ground tire rubber to 30 mesh, 18-25 weight percent polystyrene, and 20-25 weight percent agglomerating agent in the form of waste water based paint.

EXAMPLE 2

Another example additive consists of 50-60 weight percent ambient ground tire rubber to 30 mesh, 20-30 weight percent polyethylene terephthalate, 10-20 weight percent agglomerating agent in the form of waste water based paint and waste water based ink mixture, 2-5 weight percent mineral clay, in this case, montmorillonite, and 1-3 weight percent compatibilizer in the form of PP grafted MAH.

EXAMPLE 3

In another example the additive consists of 45-55 weight percent ambient ground tire rubber to 30 mesh, 15-25 weight percent polystyrene, 15-25 weight percent agglomerating agent in the form of waste water based paint and waste water based ink mixture, 2-5 weight percent mineral clay, in this case, attapulgite, 1-3 weight percent reactive agent in the form of sulphuric acid, and 1-3 weight percent compatibilizer in the form of SBR grafted MAH.

EXAMPLE 4

In yet another example, said additive includes 40-60 weight percent ground tire rubber, 0.5-10 weight percent gelling clay, 0.1-3.0 weight percent reactive agent, 25-35 weight percent plastomer, 0.1-5 weight percent handling and agglomerating agent and 0.1-5 weight percent compatibilizer.

EXAMPLE 5

In yet another example, said additive includes 50-65 weight percent ground tire rubber, 0.5-5 weight percent gelling clay, 0.1-2.0 weight percent reactive agent, 20-30 weight percent plastomer, 0.1-5 weight percent handling and agglomerating agent and 0.1-5 weight percent compatibilizer.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A modified ground tire rubber based additive, comprising:
    30-99 weight percent of ground tire rubber;
    0.9-69.9 weight percent of a mixture of waste water-based paint and a material selected from a group consisting of a gelling clay, a reactive agent, a plastomer, a handling and agglomerating agent other than waste water-based paint and mixtures thereof; and
    0.1-5 weight percent compatibilizer.

2. The modified ground tire rubber based additive of claim 1, wherein said gelling clay is selected from a group of materials consisting of bentonite, montmorillonite, attapulgite, gilsonite and mixtures thereof.

3. The modified ground tire rubber based additive of claim 2, wherein said reactive agent is selected from a group of materials consisting of a peroxide, hydrogen peroxide, benzoyl peroxide, a sulfur containing compound, sulfuric acid, sulfur and mixtures thereof.

4. The modified ground tire rubber based additive of claim 1, wherein said plastomer is selected from a group consisting of polystyrene, high impact resistant polystyrene, poly(acrylonitrile-co-butadiene-co-styrene), poly(phenylene oxide), glass filled polyethylene terephthalate, poly(ethylene terephthalate), acrylic and polyester, either virgin or recycled.

5. The modified ground tire rubber based additive of claim 4, wherein said handling and agglomerating agent is selected from a group of materials consisting of an oil, a wax, soybean oil, linseed oil, engine oil, recycled engine oil, vegetable oil, engineering oil, recycled engineering oil, ship oil, recycled ship oil, olive oil, hydraulic oil, hydrogenated castor oil (HCO), hydrogenated palm oil, stearic acid, paraffin, carnauba wax, slack wax, recycled PE wax, microcrystalline wax and mixtures thereof.

6. The modified ground tire rubber based additive of claim 5, wherein said compatibilizer is selected from a group of materials consisting of a maleic anhydride (MAH) grafted polymer, polyphosphoric acid (PPA), transpolyoctenamer rubber (TOR) and mixtures thereof.

7. The modified ground tire rubber based additive of claim 5, wherein said ground tire rubber is between 5 mm and 0.05 mm in diameter.

8. The modified ground tire rubber based additive of claim 5, wherein said additive includes 40-70 weight percent ground tire rubber, 1-10 weight percent gelling clay, 0.1-5 weight percent reactive agent, 10-25 weight percent plastomer, 0.5-5 weight percent handling and agglomerating agent and 0.5-5 weight percent compatibilizer.

9. The modified ground tire rubber based additive of claim 1, wherein said additive includes 30-50 weight percent ground tire rubber, 0.5-10 weight percent gelling clay, 0.1-3.0 weight percent reactive agent, 25-35 weight percent plastomer, 0.1-5 weight percent handling and agglomerating agent and 0.1-5 weight percent compatibilizer.

10. The modified ground tire rubber based additive of claim 8, wherein said ground tire rubber is between 325 and 3 mesh.

11. The modified ground tire rubber based additive of claim 1, wherein said additive is mixed at a temperature of 40-110° C. to promote molecular entanglements and polar-polar interactions between said ground tire rubber and any plastomer in the additive.

12. The modified ground tire rubber based additive of claim 1, wherein said compatibilizer is selected from a group of materials consisting of a maleic anhydride grafted polymer, benzoil peroxide, polyphosphoric acid, transpolyoctenamer rubber and mixtures thereof.

13. An asphalt concrete incorporating the modified ground tire rubber based additive of claim 1.

14. The asphalt concrete of claim 13, including 3.5-10.5 weight percent bitumen and 0.5-20 weight percent modified ground tire rubber based additive.

15. The asphalt concrete of claim 13, including 70-90 weight percent aggregate material, 4-7 weight percent bitumen and 0.1-15 weight percent modified ground tire rubber based additive.

16. A modified ground tire rubber based additive comprising:
  30-99 weight percent of ground tire rubber, 0.9-69.9 weight percent of waste water-based paint and 0.1-5 weight percent of a compatibilizer.

17. The modified ground tire rubber based additive of claim 1, wherein the material is a plastomer.

\* \* \* \* \*